| United States Patent [19] | [11] Patent Number: 5,021,262 |
| Bouillard et al. | [45] Date of Patent: Jun. 4, 1991 |

[54] WATERPROOFING/SHAPING OF QUARRIED BUILDING MATERIALS

[75] Inventors: Gerard Bouillard, Paris; Henri Chauffriat, Lyons, both of France

[73] Assignee: Rhone-Poulenc Chimie, Courbevoie, France

[21] Appl. No.: 407,746

[22] Filed: Sep. 15, 1989

[30] Foreign Application Priority Data

Sep. 15, 1988 [FR] France ............................... 88 12304

[51] Int. Cl.$^5$ .............................................. B05D 3/12
[52] U.S. Cl. ...................................... 427/289; 83/169; 125/12; 125/13.01; 428/447; 428/540
[58] Field of Search ................. 83/169; 144/364, 380; 427/289, 387, 393.6; 125/12, 13.01; 428/447, 540

[56] References Cited

U.S. PATENT DOCUMENTS 2,829,035  4/1958  Doughty et al. ..................... 56/304
4,273,813  6/1981  Meddaugh ..................... 427/393.6 X
4,870,946 10/1989  Long et al. ...................... 83/169 X

FOREIGN PATENT DOCUMENTS 697294   1/1967  Belgium.
0084966  3/1983  European Pat. Off..

OTHER PUBLICATIONS

Chemical Abstracts, vol. 100, No. 24, Jun. 1984, p. 309, resume No. 196906a, Columbus, Ohio, U.S.; CS-A-204 158 (J. Hosek et al.), 15-12-1983.

*Primary Examiner*—Michael Lusignan
*Attorney, Agent, or Firm*—Burns, Doane, Swecker & Mathis

[57] ABSTRACT

Quarried building materials, e.g., slate, marble and stone, are waterproofed and structurally shaped by sawing such quarried material while concomitantly introducing water into the cutting zone, and wherein the process water contains an effective waterproofing amount of a silicone emulsion.

6 Claims, No Drawings

WATERPROOFING/SHAPING OF QUARRIED BUILDING MATERIALS

BACKGROUND OF THE INVENTION

1. Field of the Invention

The present invention relates to the waterproofing of quarried materials as they are sawn into useful shapes, and, more especially, to such waterproofing of quarried materials utilizing a silicone emulsion.

2. Description of the Prior Art

Currently, it is required that building materials be effectively waterproofed, in particular those materials whose surfaces are destined to be partly or wholly exposed to inclement weather. Indeed, the action of rainwater combined with the various chemical agents associated with atmospheric pollution is the cause of several types of damage to such materials.

Among these types of damage, the best known are the following:
(i) wet stains;
(ii) efflorescence of inorganic salts;
(iii) penetration of water within the material, freezing of this water and erosion of the material by fragmentation;
(iv) the growth of moss;
(v) soiling; and
(vi) chemical corrosion.

Silicone emulsions have long been successfully used for waterproofing various materials employed in the building industry, such as concrete, plaster, timber, bricks, terracotta tiles, and the like. The emulsion is typically either applied to the surface of such materials or, when possible, it is introduced into the bulk mass of the material during the manufacture thereof as, for example, in the case of concrete.

It is also well known, however, that it is difficult to accomplish effective waterproofing of natural stone building materials originating from quarries and shaped by a sawing operation, such as ashlars, slate, stone slabs for paving or external facing lining, marble blocks and slabs, and the like.

Suitable waterproofing of these particular stone materials is not accomplished using a silicone emulsion, even when large amounts of silicones are deposited per unit of surface area.

SUMMARY OF THE INVENTION

Accordingly, a major object of the present invention is the provision of an improved process for waterproofing building materials excavated from a quarry and shaped by sawing.

Briefly, the present invention features the shaping and conjoint waterproofing of quarried building materials during a saw cutting operation (sawing) wherein water is introduced into the cutting zone as the materials are being sawn, and further wherein the water contains an effective waterproofing amount of a silicone emulsion.

DETAILED DESCRIPTION OF THE PREFERRED EMBODIMENTS OF THE INVENTION

More particularly according to the present invention, the building materials under consideration are cut to the desired size from blocks excavated from the quarry by means of saws fitted with one or more blades driven in a continuous or alternating motion by a motor.

For purposes of cooling the saw blade and facilitating the cutting operation, water is continuously introduced onto the saw blade itself and/or into the cutting region.

Surprisingly and unexpectedly, it has now been found that the addition of an effective amount of a waterproofing silicone emulsion to such water during the cutting operation results in the production of a perfectly waterproofed building material.

One quite important first advantage of the process of the invention is that perfect waterproofing is effected using an amount of silicone deposited onto the surface of the material (calculated as the solids content) ranging from 1 to 50 $g/m^2$, with amounts of from 2 to 20 $g/m^2$ providing excellent results.

The waterproofing of a quarried material by the conventional process of depositing the waterproofing silicone agent in the form of an emulsion or a solution in an organic solvent is much less satisfactory in quality, even when the amount of silicone deposited is equal to or even much greater than the amount used according to the present invention.

Without wishing to be bound to any particular scientific explanation, it is believed that the waterproofing treatment using the process of the invention is applicable to all of the surfaces of the quarried material.

In addition, during the cutting operation, the building material is completely impregnated with the water doped with the added emulsion, the penetration of this water being accentuated by the mechanical action of the saw blades which forces the mixture to penetrate internally as far as the finest capillaries of the material.

The distribution of the waterproofing silicone agent is consequently better and is effected more deeply within the material, even though the amount of silicone can be quantitatively much less than the amount typically employed in conventional waterproofing processes.

A final advantage of the process of the invention is that it permits the cutting and the waterproofing of the quarried material to be carried out in a single operation.

The silicone emulsion may be incorporated into the water in a storage vessel and the water containing the additive is then injected in the cutting region. Another technique entails delivering the silicone emulsion and the water separately to the cutting region and conducting their mixing in situ.

The amounts of waterproofing silicone agents which are deposited per $m^2$ of surface area obviously depend on the amounts of water employed during the cutting operation and especially on the porosity of the cut material to be treated. The more porous the material (presence of many capillaries), the greater the amounts required to provide suitable waterproofing. Using 0.1 to 10 parts by weight of silicone emulsion containing from 5% to 60% by weight of solids per 100 parts of water is characteristically sufficient to provide adequate amounts for purposes of effective waterproofing.

Any waterproofing silicone emulsion, preferably those especially adapted for waterproofing building materials, can be used in the process of the present invention.

These emulsions are well known to this art. They are typically available commercially and the various processes for their production are widely described in the literature. Particularly suitable are silicone resin emulsions, emulsions of alkali metal organosiliconates, alkyltrialkoxysilane emulsions and emulsions of polydiorganosiloxanes optionally bearing organic functional groups.

The silicone resin emulsions may comprise a resin or mixtures of resins comprising recurring units selected from among $R_3SiO_{0.5}$, $R_2SiO$, $RSiO_{1.5}$ and $SiO_2$, with R being a $C_1-C_6$ alkyl radical, such as described, for example, in EP-A-178,191 and U.S. Pat. Nos. 4,525,502 and 4,717,599, it being possible for certain of the radicals R to be $C_1-C_6$ alkoxy radicals, as described, for example, in EP-A-130,521, EP-A-157,323 and U.S. Pat. No. 3,650,852.

Emulsions of alkali metal organosiliconates are described, for example, in Belgian Patent BE-A-817,696. Alkyltrialkoxysilane emulsions are described, for example, in DE-A-3,751,514.

In order to further illustrate the present invention and the advantages thereof, the following specific examples are given, it being understood that same are intended only as illustrative and in nowise limitative.

EXAMPLES 1 TO 3

A circular steel saw was used to cut, from limestone blocks excavated from three different quarries, test specimens which were rectangular parallelepipeds having the dimensions of $10 \times 20 \times 2.5$ cm, and the porosities of which were as follows:

(a) Saint Vaast stone (Example 1) : 42%
(b) Massangis stone (Example 2) : 13%
(c) Savonniore stone (Example 3) : 27%.

The saw employed had a circular blade 30 cm in diameter, driven at 3,000 revolutions per minute by an electric motor.

400 liters of water per hour were poured onto the blade during the sawing operation, this water having been doped beforehand with two liters of a waterproofing silicone resin emulsion which had the following composition:

(i) methyl resin: 40% by weight [resin produced by the hydrolysis in isopropyl ether of a mixture of the following methylchlorosilanes: $CH_3SiCl_3$ (67% by weight), $(CH_3)_2SiCl_2$ (22% by weight) and $(CH_3)_3SiCl$ (11% by weight)];
(ii) polyvinyl alcohol 2% by weight;
(iii) propylene glycol 2% by weight;
(iv) water 56% by weight.

The test specimens were weighed immediately after the cutting and then after drying for two weeks at ambient temperature and in the open air. The difference in weight between the two weighings gave the amount of water absorbed, permitting calculation of the quantity Q (in $g/m^2$) of solids content of the silicone resin absorbed by the test specimens. Q is therefore calculated in g per $m^2$ of surface area of test specimen produced by cutting the original stone blocks.

The extent of waterproofing was assessed by means of the pipe water absorption test. This test consisted in placing on the test specimen a glass pipe, namely, a graduated cylindrical tube open at both its ends, 26 mm in diameter and containing ahead of water of 92 mm or 200 mm. The opening of the pipe in contact with the surface of the test specimen was equipped with an elastomeric O-ring seal.

The volume in ml, $V_{92}$ or $V_{200}$, of the water absorbed by the test specimen was measured, beginning from the end of the fifth minute and until the end of the fifteenth minute, also beginning from the time when the pipe was set at the 0 level (92 or 200 mm of head of water). The volume V is denoted by $V_{92}$ or $V_{200}$ according to whether a pipe with a 92 mm or with a 200 mm of head of water was employed, respectively.

The results obtained are reported in the Table below, where the obtained values of Q and of $V_{92}$ or $V_{200}$ are shown.

COMPARATIVE EXAMPLES 4C TO 6C:

The same procedure as in Examples 1 to 3 was repeated exactly, except that the saw cooling water was devoid of the silicone emulsion.

The results obtained are also reported in the Table below.

COMPARATIVE EXAMPLES 7C TO 9C:

The same procedure as in Examples 4C to 6C was repeated, except that the sawn test specimens were dried for two weeks in the open air and at ambient temperature and were then waterproofed with the saw cooling water employed in Examples 1 to 3 and, therefore, doped with the silicone emulsion. The doped water was applied to the test specimens with a brush until the same quantity Q of silicone resin as that deposited in Examples 1 to 3, respectively, was applied. This brush coating was time consuming and required approximately 30 minutes to apply the intended quantities Q.

The results obtained are also reported in the Table below.

TABLE

| EXAMPLES | 1 | 2 | 3 | 4C | 5C | 6C | 7C | 8C | 9C |
|---|---|---|---|---|---|---|---|---|---|
| Q (g/m²) | 8 | 2.5 | 5 | 0 | 0 | 0 | 8 | 2.5 | 5 |
| V92 (ml) | 4.2 | 0 | — | 30 | 0.35 | — | 25 | 0.35 | — |
| V200 (ml) | — | — | 0.4 | — | — | 1.8 | — | — | 1.3 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of a waterproofed and sawn quarried building material, comprising sawing a quarried building material into a structurally shaped article while concomitantly introducing water into the cutting zone, such water containing an effective waterproofing amount of a silicone emulsion.

2. The process as defined by claim 1, wherein the amount of silicone emulsion contained in the water is such that from 1 to 50 g of silicone, calculated as solids content, is deposited per $m^2$ of surface area of said quarried building material.

3. The process as defined by claim 1, wherein from 0.1 to 10 parts by weight of silicone emulsion comprising from 5% to 60% by weight of silicone solids are contained in each 100 parts by weight of water.

4. The process as defined by claim 1, said silicone emulsion comprising a silicone resin, an alkali metal organosiliconate, an alkyltrialkoxysilane, a polydiorganosiloane, or a polydiorganosiloxane bearing organic functional groups.

5. The process as defined by claim 1, said quarried building material comprising stone, marble or slate.

6. The waterproofed and sawn quarried building material produced by the process as defined by claim 1.

* * * * *